United States Patent [19]
Straub et al.

[11] Patent Number: 5,246,181
[45] Date of Patent: Sep. 21, 1993

[54] PIVOTING HOSE REEL ASSEMBLY

[75] Inventors: William D. Straub, New Berlin; Bruce M. Boczkiewicz, Mukwonago; Jeffrey T. Seawell, Waukesha, all of Wis.

[73] Assignee: Super Products Corporation, New Berlin, Wis.

[21] Appl. No.: 786,295

[22] Filed: Nov. 1, 1991

[51] Int. Cl.$^5$ .............................................. B65H 75/40
[52] U.S. Cl. ................................ 242/86.5 R; 242/86.2
[58] Field of Search ................ 242/86.5 R, 86.2, 106; 254/134.3 R, 323, 332; 134/167 C, 168 C; 15/104.33

[56] References Cited

U.S. PATENT DOCUMENTS

| | | | |
|---|---|---|---|
| 3,658,589 | 4/1972 | Shaddock | 134/21 |
| 4,199,837 | 4/1980 | Fisco | 134/168 C |
| 4,896,686 | 1/1990 | Schmidt | 134/167 C |
| 4,993,443 | 2/1991 | Buchert | 134/167 C |

Primary Examiner—Daniel P. Stodola
Assistant Examiner—Eileen Dunn
Attorney, Agent, or Firm—Foley & Lardner

[57] ABSTRACT

A hose reel support assembly for supporting a hose reel assembly on a vehicle, the support assembly including a number of support beams secured to the vehicle, a base plate mounted on the support beams and having an elongate slot, the hose reel assembly being supported on the base plate with the axis of the hose reel located in a parallel relation to the elongate slot, the hose reel assembly being mounted on the support assembly for simultaneous rotation and translation of the support assembly from the position with the axis of rotation of the reel assembly parallel to the slot to a position transverse to the slot. The support assembly being tiltable forwardly to move the hose reel assembly away from the vehicle.

17 Claims, 8 Drawing Sheets

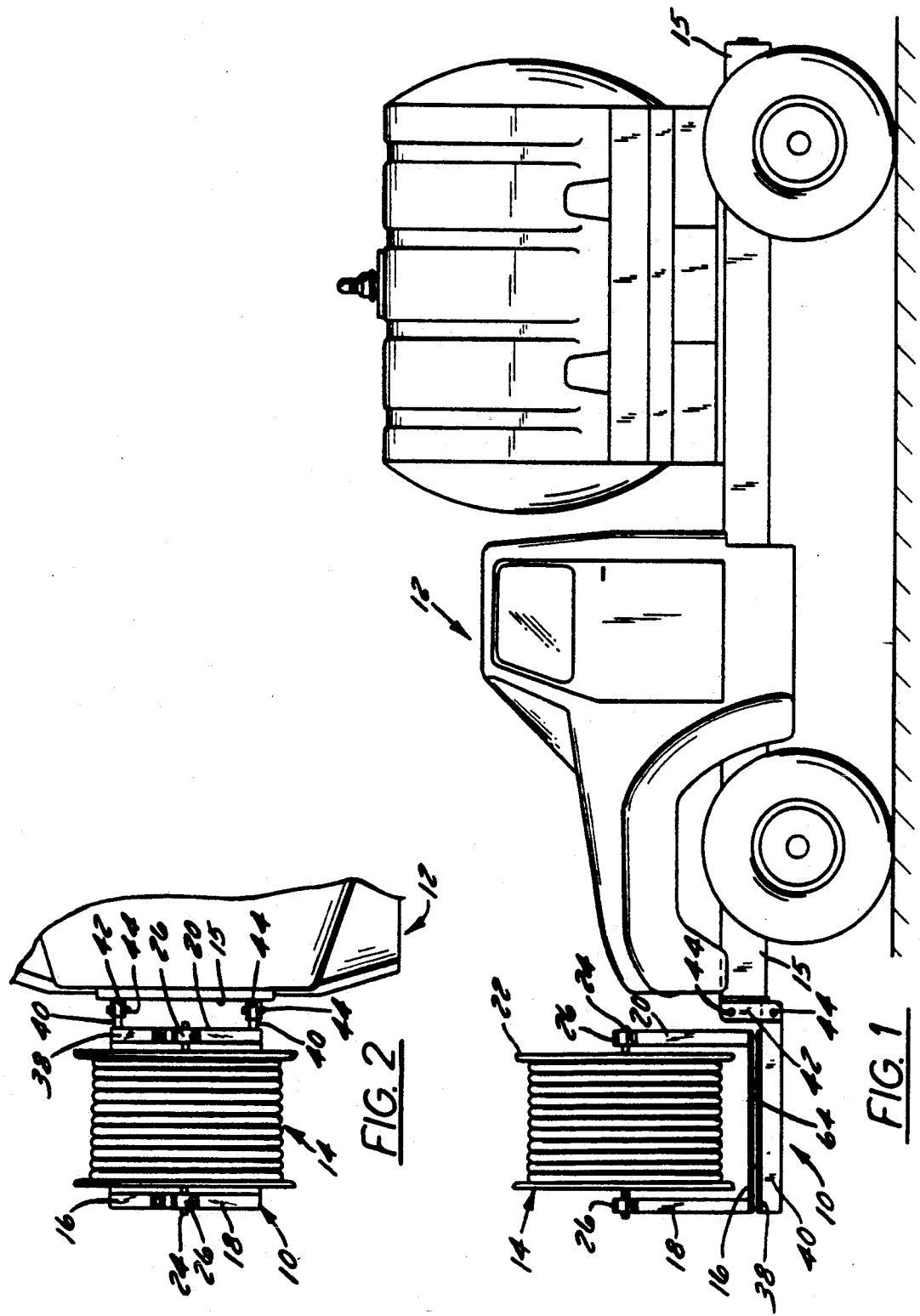

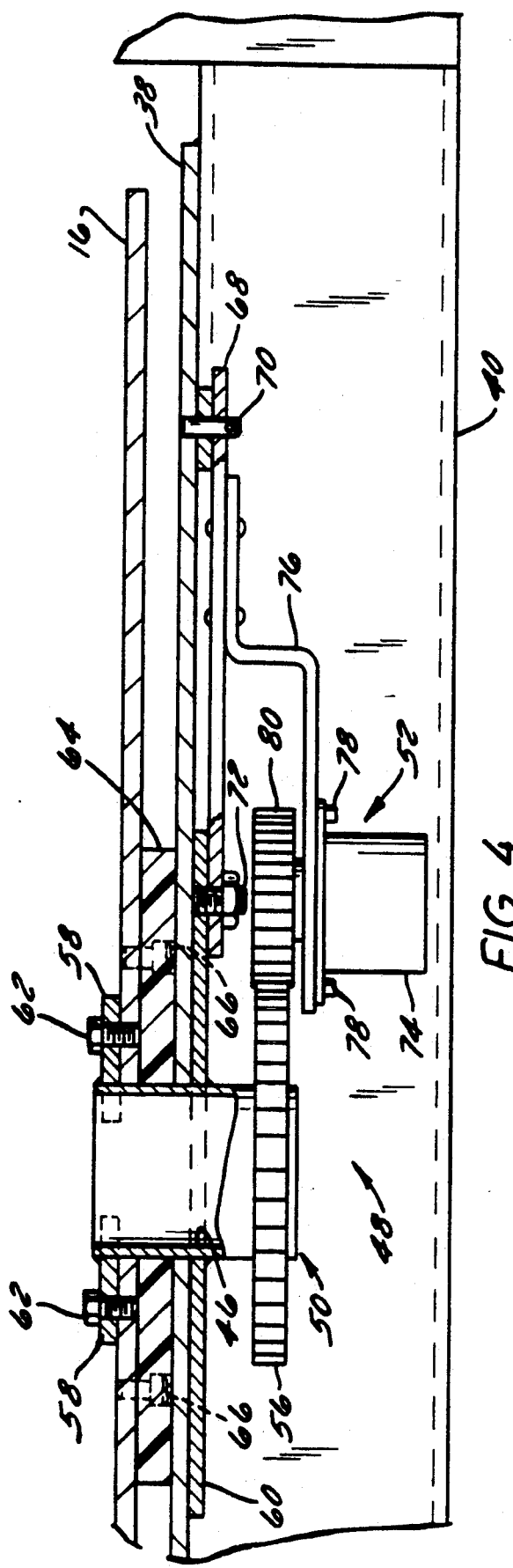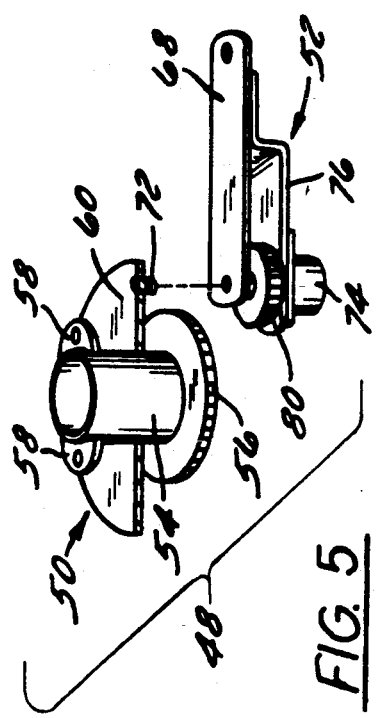

PIVOTING HOSE REEL ASSEMBLY

FIELD OF THE INVENTION

The present invention relates to portable discharge hose reel assemblies and more particularly to an apparatus for supporting a hose reel assembly for simultaneous rotary and linear movement with respect to the hose reel assembly support.

BACKGROUND OF THE INVENTION

Sewer cleaning vehicles are generally provided with a hose reel assembly for storage of the hose on the vehicle. It is desirable to have the hose reel mounted for rotary motion on its own axis as well as rotation on a vertical axis in order to allow for direct dispensing of the hose into a manhole.

Typical systems of this type are shown in U.S. Pat. No. 3,658,589, issued on Apr. 25, 1972, entitled "Catch Basin And Sewer Pipe Cleaner" and U.S. Pat. No. 4,896,686, issued Jan. 30, 1990, entitled "Pivoting Hose Storage Reel And Mounting Thereof." In these systems a frame support is mounted beneath the frame of the vehicle with a lateral positioner mounted for movement in the frame support for moving the hose storage reel away from the vehicle to which it is mounted. The reel can then be rotated about an axis transverse to the rotary axis of the reel, thus allowing for alignment with a catch basin or a manhole for sewer laterals or a sewer line.

SUMMARY OF THE PRESENT INVENTION

The hose reel support assembly according to the present invention is mounted directly to the perimeter of a horizontal vehicle. The assembly includes a base plate extending outwardly from the frame of the vehicle. A hose reel assembly is mounted on the base plate with the axis of revolution of the reel located in a parallel relation to a slot provided in the base plate. A linkage assembly is connected to the hose reel assembly through the slot in the base plate. The linkage assembly includes an arm which is pivotally connected to the base plate and to a cylindrical assembly connected to the hose reel assembly at a point offset from the vertical axis of revolution of the cylindrical assembly. A reversible actuator is mounted on the arm to simultaneously translate and rotate the hose reel as the cylindrical assembly moves along the slot.

One advantage of the present invention is the ability to mount the hose reel assembly anywhere on the outside frame of the vehicle, i.e., front, back or sides.

A further advantage of the present invention is the ability to simultaneously rotate the hose reel assembly about a vertical axis as well as move the hose reel assembly outwardly from the vehicle frame to a position angularly aligned with a catch basin or manhole.

A further advantage of the present invention is the ability to store the reel closely adjacent the frame of the vehicle for storage and transportation.

A still further advantage of the present invention is the provision for tilting the hose reel assembly outwardly from the vehicle to provide space for opening the hood of the vehicle.

Other principal features and advantages of the invention will become apparent to those skilled in the art upon review of the following drawings, the detailed description and the appended claims.

BRIEF DESCRIPTION OF THE DRAWINGS

FIG. 1 is a side elevation view of a vehicle showing the hose reel assembly mounted on the front of the vehicle frame.

FIG. 2 is a top view of the hose reel assembly shown in FIG. 1.

FIG. 4 is a view partly in section of the drive assembly.

FIG. 5 is a perspective view of the linkage assembly.

Figure 3:
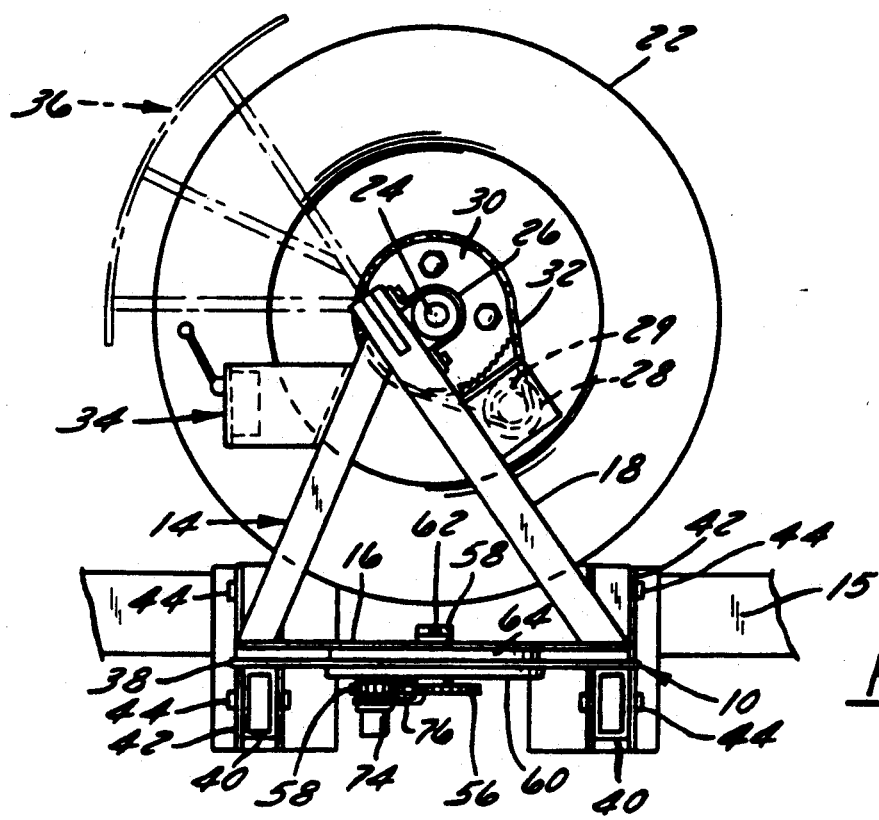
FIG. 3 is a side elevation view of the hose reel assembly.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DETAILED DESCRIPTION OF THE PREFERRED EMBODIMENTS

The hose reel support assembly 10 is shown mounted on the front of the frame 15 on a vehicle 12 (FIG. 1) with the hose reel assembly 14 shown mounted on the support assembly. As seen in the drawing, the hose reel assembly 14 is shown in close proximity to the front of the vehicle with the hose reel axis extending longitudinally with respect to the vehicle. It should be noted that the support assembly can be supported at any location to the frame of the vehicle as desired.

The hose reel assembly 14 typically includes a support plate 16, a pair of support arms 18 and 20 and a hose reel 22. The hose reel is supported by an axle 24 which is secured to the support arms 18, 20 by bearings 26. The reel 22 is rotated by a reversible motor 28 having a drive gear 29. The motor 28 is mounted on one of the arms 18. The drive gear 29 is connected to a drive gear 30 on the reel axle 24 by means of a chain 32. The motor is operated by a control box 34 mounted on the support arm 18. A face guard 36 may be provided on the support arms 18 and 20 to protect the operator from the end of the hose.

In accordance with the invention the hose reel assembly 14 is supported on a base plate 38 which is secured to a pair of beams 40 which are secured to the frame by brackets 42 and bolts 44. By way of example, beams 40 may be fabricated from rectangular tubing. The base plate 38 includes a longitudinally extending slot 46 which defines the limits of travel of the hose reel assembly with respect to the front of the frame of the vehicle.

The hose reel assembly 14 is simultaneously rotated and translated with respect to the base plate by means of a linkage assembly 48, FIG. 5. The linkage assembly generally includes a cylindrical rotary assembly 50 and an arm or link assembly 52. The rotary assembly 50 includes a cylindrical pivot member 54 having a driven gear 56 at one end, a pair of brackets 58 at the other end, and a linking plate 60 mounted on the pivot member 54 intermediate the brackets 58 and the drive gear 56. The brackets 58 are secured to the support plate 16 by means of bolts 62. Means are provided between the support plate 16 and base plate 38 for providing sliding motion between the support plate and base plate, such means is in the form of a bearing pad 64, which may be fabricated from nylon or other suitable material, secured to the support plate 16 by bolts 66. The bottom surface of the pad 64 slides on the top surface of base plate 38. By way of further example, the pad 64 could be replaced with another type of bearing arrangement such as a plurality of spherical rollers provided on the base plate 38.

The rotary assembly 50 is rotated with respect to the base plate by means of the arm assembly 52. The arm assembly includes an arm 68 which is pivotally connected to the base plate 38 by a pin 70 and to the linking plate 60 by means of a pin 72. The cylindrical rotary assembly 50 may be rotated by hand or by means of an actuator 74 supported on the arm 68 by a bracket 76. By way of example, actuator 74 may be a hydraulic motor. The actuator 74 is secured to the brackets 76 by bolts 78. A drive gear 80 is mounted on the motor which is positioned to engage the driven gear 56. Energization of the actuator 74 will simultaneously rotate the driven gear 56 to rotate the reel assembly and simultaneously translate the reel assembly outwardly in the slot 46.

Figure 7:
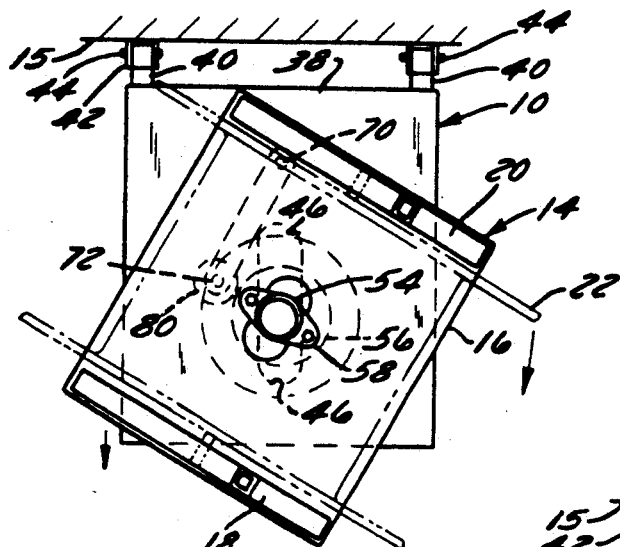
FIG. 7 is a view similar to FIG. 6 showing the platform rotated 30° with respect to the base plate.
Figure 8:
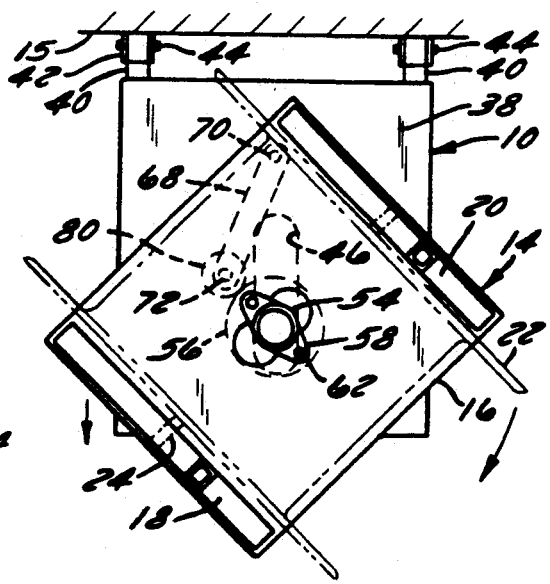
FIG. 8 is a view similar to FIG. 6 showing the platform rotated 45° from the base plate.
Figure 9:
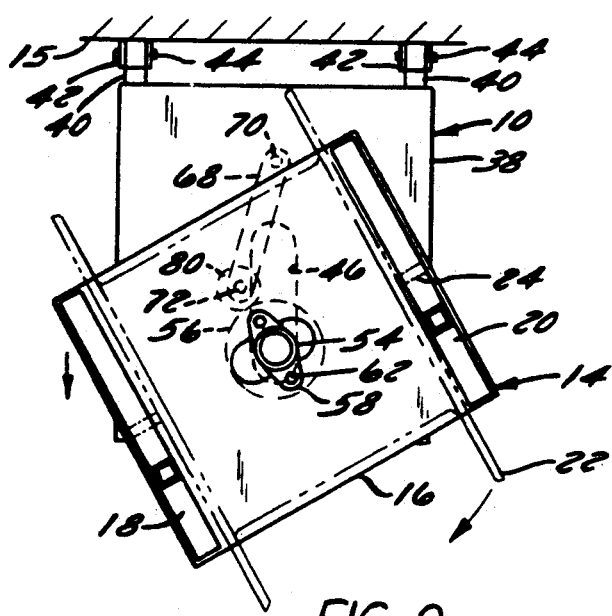
FIG. 9 is a view similar to FIG. 6 showing the platform rotated 60° from the base plate.
Figure 6:
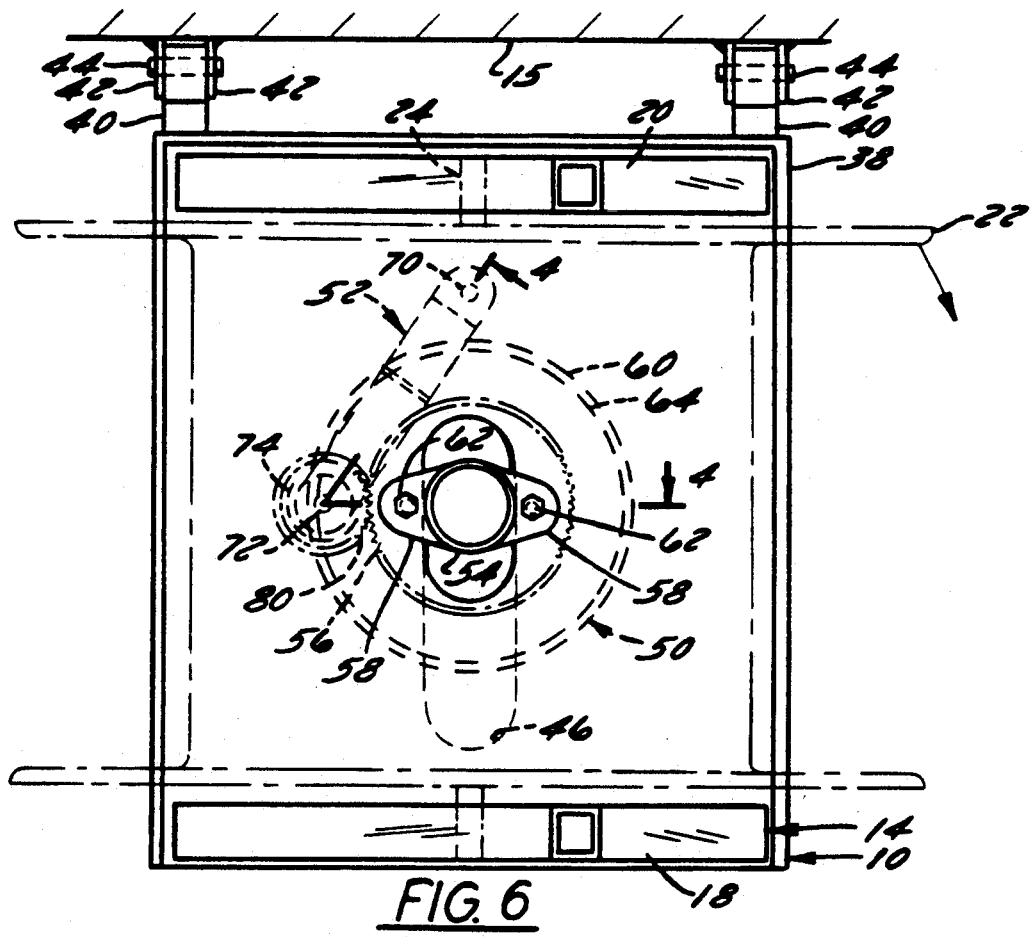
FIG. 6 is a top view taken on line 6—6 of FIG. 3 showing the hose reel aligned with the front of the frame of the vehicle.
Figure 10:
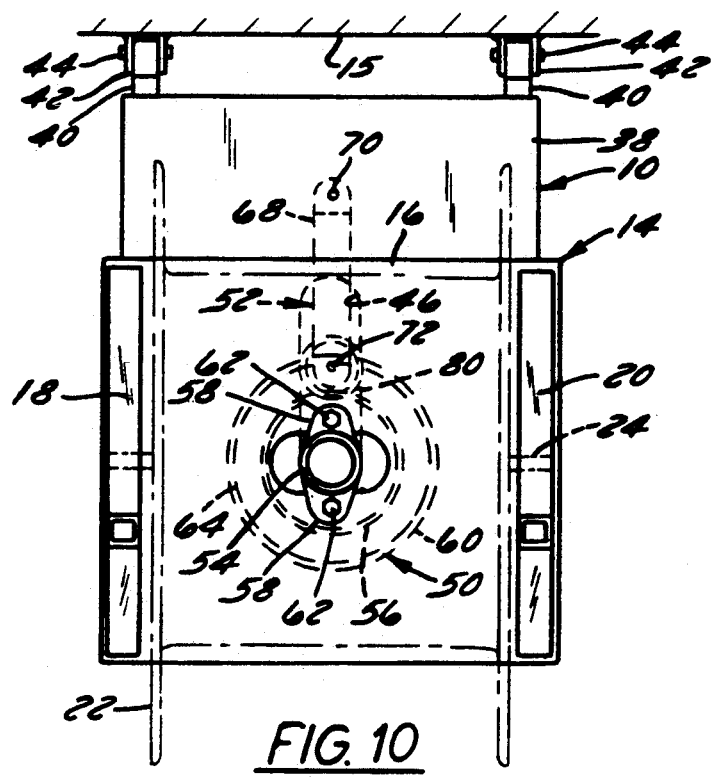
FIG. 10 is a view showing the platform rotated 90° with respect to the base plate.
Figure 11:
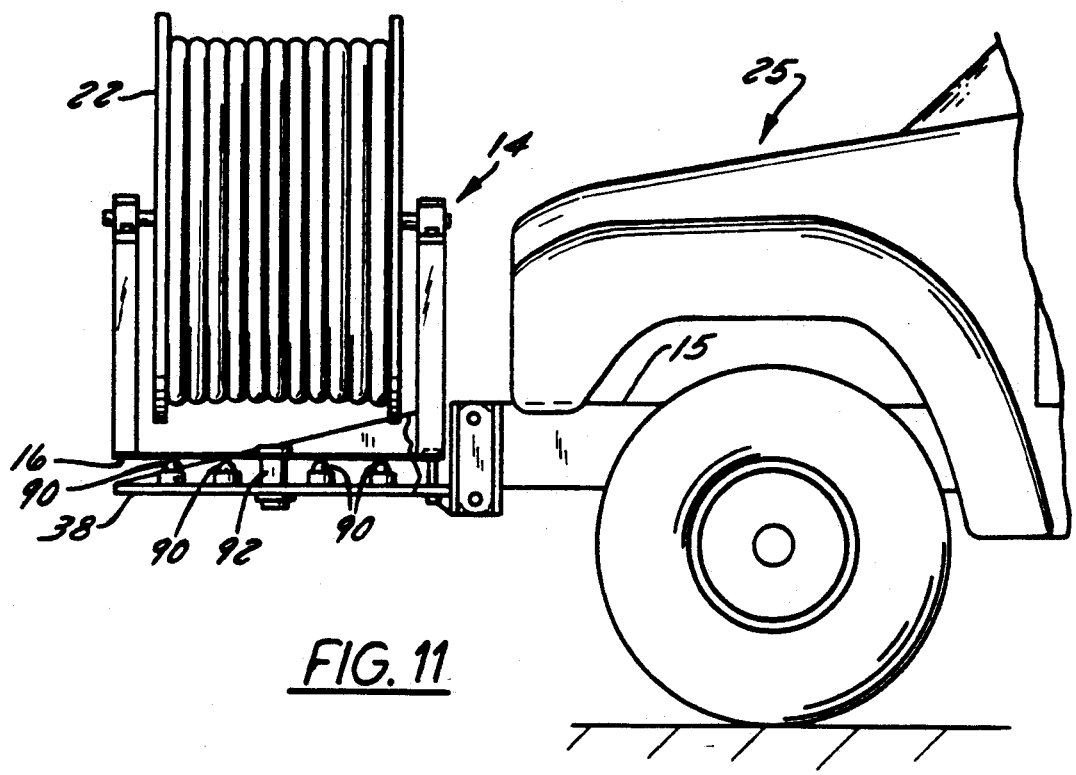
FIG. 11 is a side elevation view of the front of a vehicle showing a manually actuatable hose reel assembly.
Figure 12:
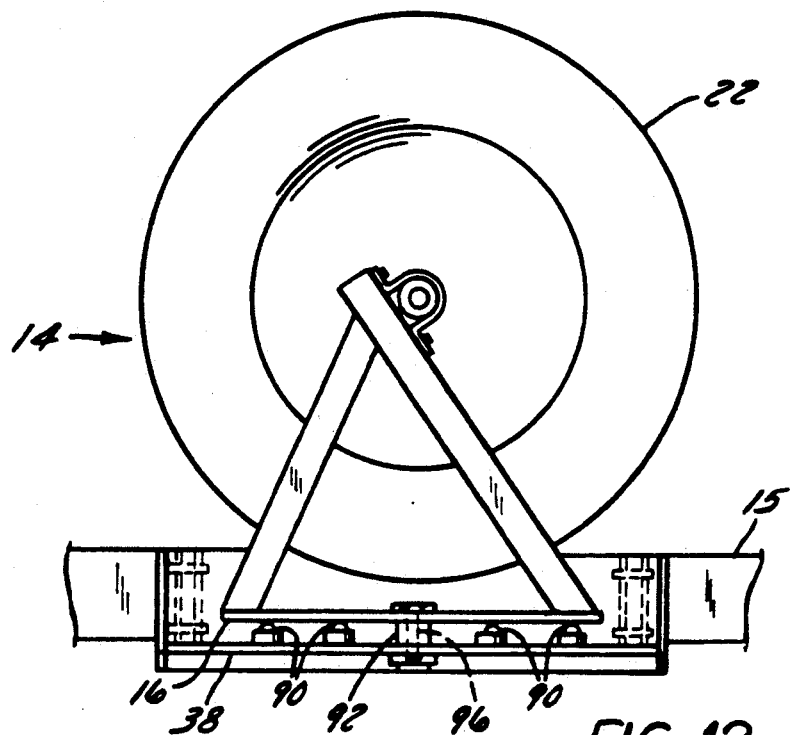
FIG. 12 is a front view of the manually actuatable hose reel assembly.
Figure 13:
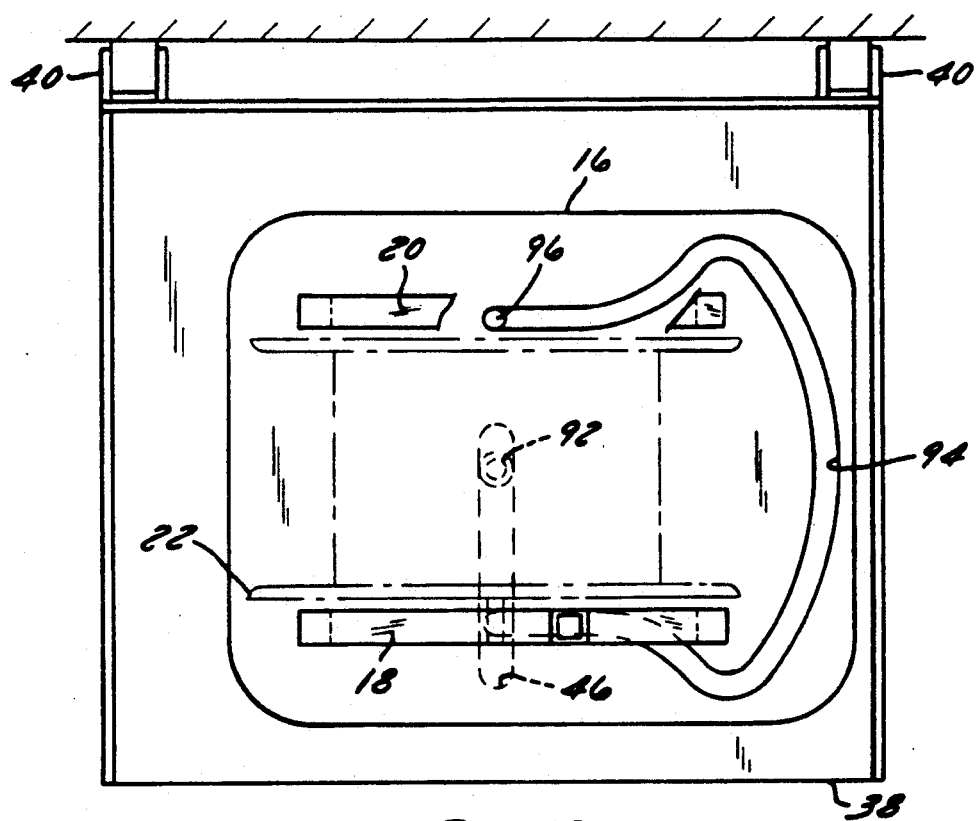
FIG. 13 is a top view of the hose reel assembly of FIG. 11 showing the cam slot arrangement in the support plate.

In this regard and referring to FIG. 7, the hose reel assembly 14 is shown rotated to a 30° position with respect to the slot 46 in the base plate 38. The hose assembly 14 is shown at a 45° position in FIG. 8, a 60° position in FIG. 9 and a 90° position in FIG. 10. It should be understood that the hose assembly can be stopped at any degree of movement between zero and 180° depending upon the relationship of the hose reel to the catch basin or manhole. Once the reel assembly has been located at the desired location with respect to the manhole or catch basin the hose can be dropped directly into the manhole.

An alternate means for supporting the hose reel assembly 14 is shown in FIGS. 11, 12, 13 and 14. In this embodiment of the invention, the support plate 16 is supported on a number of spherical rollers or ball type casters 90 mounted on the base plate 38. A guide 92 is mounted on the bottom of support plate 16 which is aligned with the longitudinally extending slot 46 in base plate 38. The support plate 16 includes a cam slot 94 in the form of a "U". A pin 96 is aligned with the cam slot 94 and is mounted in the base plate 38 in close proximity to the vehicle. The hose reel assembly 14 is manually rotated on the rollers 90 to align the reel 22 with the manhole or catch basin. As the assembly 14 is rotated, the pin 96 in the cam slot 94 will cause the support plate 16 to move outwardly from the front of the vehicle. The guide 92 will follow the path of the longitudinal slot 46 as described above.

The hose reel assembly 14 has been described herein as being supported on the top of the support assembly 10. However, it should be understood that the support assembly may be inverted with the hose reel assembly 14 suspended beneath the support assembly 10. If inverted to this position, the slide pad 64 should be located between the base plate 38 and pivot plate 60. With this arrangement the support assembly 10 can be mounted at the level of the hood with the support assembly 10 suspended directly over the catch basin or manhole.

Figure 14:
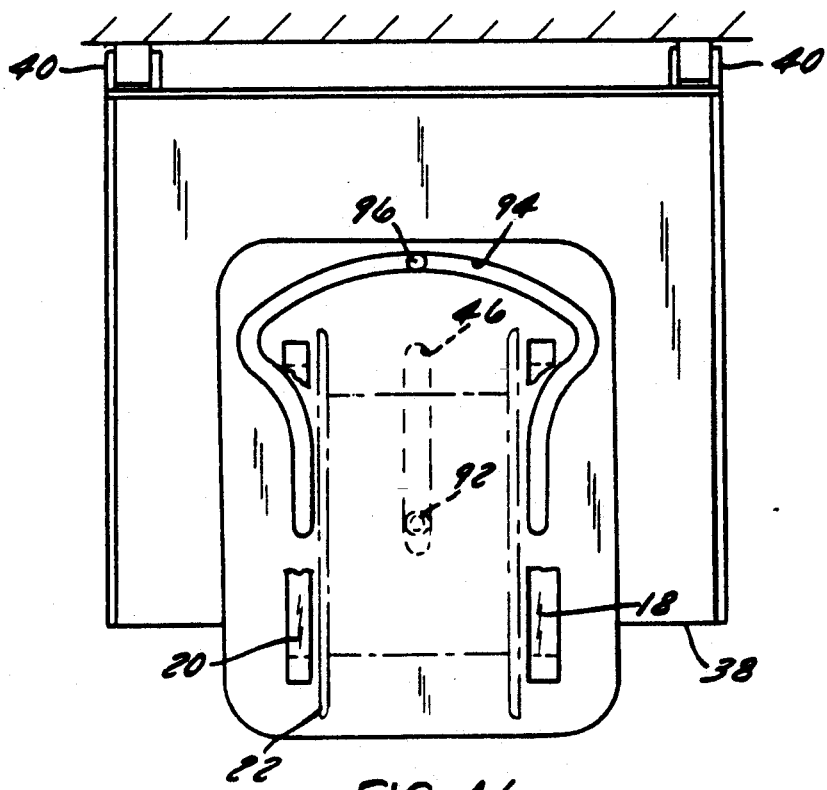
FIG. 14 is a view similar to FIG. 13 with the reel rotated 90°.
Figure 15:
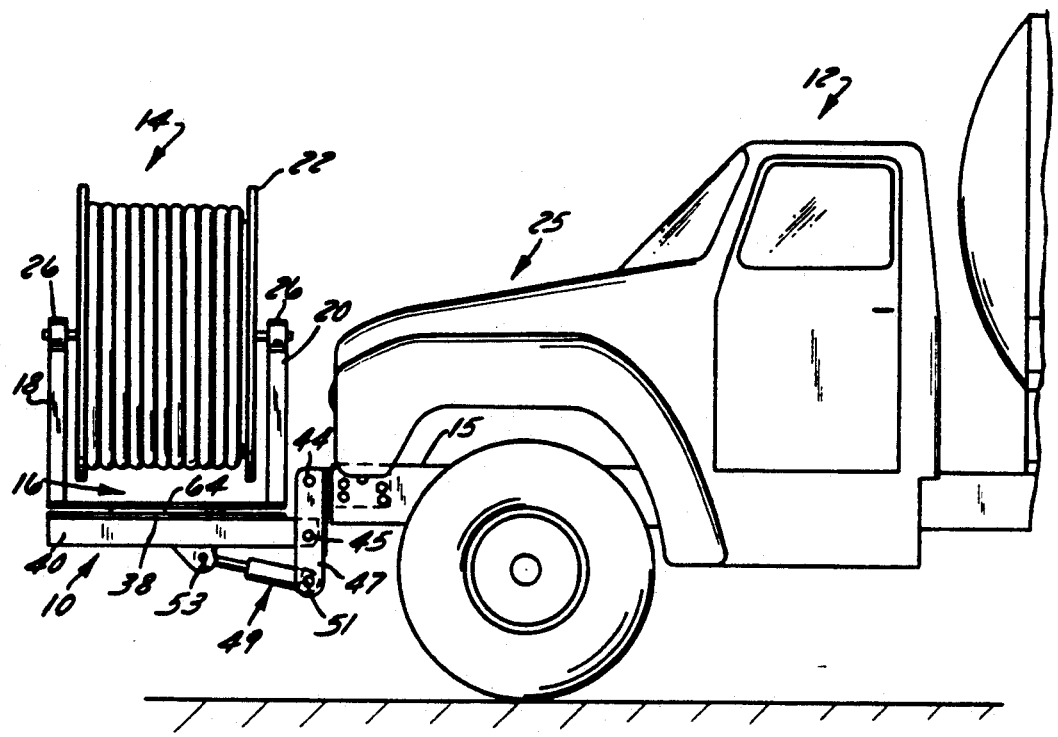
FIG. 15 is a side elevation view of the hose reel support assembly pivotally mounted on the vehicle frame.
Figure 16:
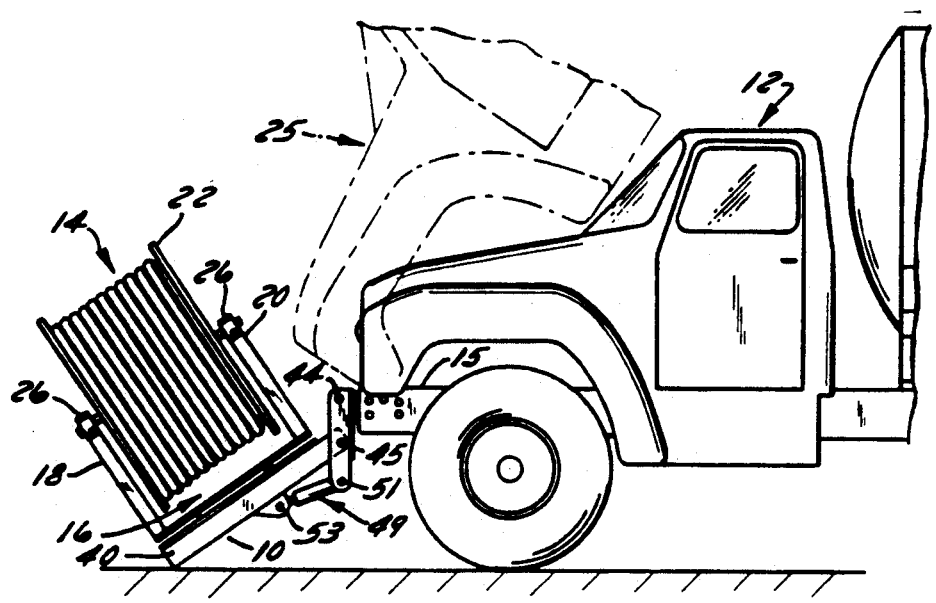
FIG. 16 is a view similar to FIG. 14 showing the support assembly tilted outwardly from the vehicle.

Referring to FIGS. 15 and 16, an alternate support assembly 43 is shown for pivotally supporting the hose reel assembly 14 on the front of the vehicle. In this regard, it should be noted that access to the engine of many vehicles is achieved by pivotally mounting the hood 25 on the frame 15. However, in order to provide room for the hood, the hose reel assembly 14 has to be retracted to provide sufficient clearance for the hood. This is achieved by means of the alternate support assembly 43. The brackets 42 are replaced by brackets 47 which are secured to the frame 15 by bolts 44 and pivot pin 45. The beams 40 are connected to pivot the pins 45. A piston and cylinder assembly 49 is connected to the lower end of bracket 47 by pin 51 and to beams 40 by pin 53. The piston and cylinder assembly 49 can be either hydraulic or pneumatic as desired. The hose reel assembly 14 is retracted by activating assembly 49 to pivot the beams 40 downward as shown in FIG. 14. The hood 25 can then be opened to provide access to the engine.

Thus, it should be apparent that there has been provided in accordance with the present invention a pivoting hose reel assembly that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A hose reel support assembly for supporting a hose reel assembly on a vehicle, said support assembly comprising a pair of support beams secured to the vehicle, a base plate mounted on said support beams, said base plate including an elongated slot, the hose reel assembly being supported on said base plate with the axis of the hose reel located in a parallel relation to said elongated slot, said hose reel assembly being mounted on said support assembly, and means for rotating said hose reel assembly and simultaneously translating said hose reel assembly with respect to said support assembly from a position with the axis of rotation of said reel assembly parallel to said elongated slot to a position transverse to said elongated slot.

2. The support assembly according to claim 1 wherein said rotating and translating means includes a cylindrical member positioned in said elongated slot and having one end secured to said hose reel assembly, a linking plate secured to said cylindrical member, and an arm having one end connected to said base plate and the other connected to said linking plate whereby said hose reel assembly will rotate and translate with respect to said base plate as said cylindrical member is moved with respect to said slot elongated.

3. The support assembly according to claim 2 including an actuator mounted on said arm and operably connected to said cylindrical member for rotating said support assembly relative to said base plate.

4. The support assembly according to claim 3 wherein said actuator comprises a motor.

5. The support assembly according to claim 1 including a slide pad for supporting said hose reel assembly on said base plate.

6. The support assembly according to claim 1 wherein said rotating and translating means includes a cylindrical member mounted on said hose reel assembly and aligned with said elongated slot in said base plate, said hose reel assembly including a support plate having a U-shaped camming slot and a pin mounted on said base plate and being aligned with said camming slot in said support plate.

7. The support assembly according to claim 6 including means for supporting said support plate for rotary motion on said base plate.

8. The support assembly according to claim 7 wherein said supporting means comprises a plurality of spherical rollers.

9. The support assembly according to claim 7 wherein said supporting means comprises a slide pad.

10. The support assembly according to claim 1 wherein said support beams are pivotally secured to the vehicle and including means for pivoting said support beams between an operative position with respect to the vehicle to a downwardly angled position with respect to the vehicle.

11. A support assembly for supporting a hose reel assembly on a vehicle, the hose reel assembly including a support plate, a pair of reel support arms mounted on said plate and an axle for supporting the hose reel on the support arms, said support assembly comprising a base plate adapted to be mounted on the vehicle, an elongated slot in said base plate extending outwardly from the vehicle, a cylindrical member mounted on said support plate and being positioned in said elongated slot in said base plate, and means for simultaneously rotating and moving said cylindrical member in said elongated slot whereby the hose reel assembly is rotated from a position in close proximity to the vehicle to a position extending radially outwardly from the vehicle.

12. The support assembly according to claim 11 wherein said moving means includes a linking plate connected to said cylindrical member and an arm pivotally connected to said linking plate and to said base plate.

13. The support assembly according to claim 11, including a gear on said cylindrical member and a reversible drive motor mounted on said arm and being operably connected to said gear for rotating said cylindrical member.

14. The support assembly according to claim 11, including a slide pad for supporting the hose reel assembly on said base plate.

15. The support assembly according to claim 11, including a number of spherical rollers mounted on said base plate for supporting said hose reel assembly.

16. The support assembly according to claim 11, including means for pivoting said support assembly downwardly with respect to the vehicle.

17. The support assembly according to claim 11 said support plate includes a generally U-shaped camming slot and said base plate includes a pin aligned in said camming slot whereby on rotation of said support plate with respect to said base plate said camming slot will move with respect to said pin forcing said cylindrical member to move with respect to said elongated slot.

* * * * *

UNITED STATES PATENT AND TRADEMARK OFFICE
CERTIFICATE OF CORRECTION

PATENT NO. : 5,246,181
DATED : September 21, 1993
INVENTOR(S) : William D. Straub, et al.

It is certified that error appears in the above-indentified patent and that said Letters Patent is hereby corrected as shown below:

Col. 5, line 7:

-- with respect to said elongated slot. --

Signed and Sealed this

Twelfth Day of April, 1994

Attest:

BRUCE LEHMAN

*Attesting Officer*          *Commissioner of Patents and Trademarks*